Figure 1:
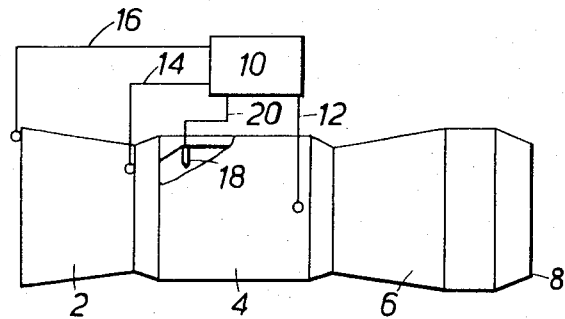

United States Patent [19]
Erlund

[11] 3,830,055
[45] Aug. 20, 1974

[54] FLAME-OUT CONTROL IN GAS TURBINE ENGINE

[75] Inventor: Mark Nicholas Erlund, Bristol, England

[73] Assignee: Rolls-Royce (1971) Limited, London, England

[22] Filed: June 13, 1973

[21] Appl. No.: 369,509

[30] Foreign Application Priority Data
June 24, 1972  Great Britain................ 29711/72

[52] U.S. Cl. .................. 60/39.09 R, 60/39.28 R
[51] Int. Cl. ........................................ F02c 7/00
[58] Field of Search ............... 60/39.09 R, 39.28 R

[56] References Cited
UNITED STATES PATENTS
| | | | |
|---|---|---|---|
| 2,948,114 | 8/1960 | Beslier et al. | 60/39.28 R |
| 2,971,338 | 2/1961 | Bodemuller | 60/39.28 T |
| 3,041,833 | 7/1962 | Vore | 60/39.09 R |
| 3,174,529 | 3/1965 | Grosselfinger et al. | 60/29.38 R |
| 3,295,317 | 1/1967 | Blackaby | 60/39.28 R |
| 3,377,848 | 4/1968 | Marvin | 60/39.28 R |
| 3,395,538 | 8/1968 | Borel et al. | 60/39.28 R |

*Primary Examiner*—William L. Freeh
*Assistant Examiner*—Warren Olsen
*Attorney, Agent, or Firm*—Stevens, Davis, Miller & Mosher

[57] ABSTRACT

An automatic re-light control system for a gas turbine engine comprises means for producing a signal corresponding to the quotient of the rate of change of speed of an engine shaft and an engine pressure and comparing this signal with a scheduled value.

An igniter is operated if the signal exceeds the scheduled value.

11 Claims, 3 Drawing Figures

PATENTED AUG 20 1974 3,830,055

SHEET 1 OF 2

1

FLAME-OUT CONTROL IN GAS TURBINE ENGINE

The present invention relates to a control system for detecting flame-out conditions in a gas turbine engine and for actuating an ignition device to re-light the engine.

When the flame in a gas turbine engine combustion chamber goes out there is an immediate drop in combustion chamber pressure, and a deceleration of the rotating parts of the engine. Flame-out detectors have been used which detect one or other of these results and which actuate a re-lighting system.

However, neither system has been found to be completely satisfactory. The system which detects the rate of decay of combustion chamber pressure is pneumatic and this makes it difficult to schedule i.e., to find a continuous curve of the pressure sensor which always lies between the maximum rate of change of pressure in rapid decelerations of the engine, for which no re-lighting is needed, and the minimum rate of change of pressure due to a flame-out condition where re-lighting is required.

The system which detects rate of decay of shaft speed gives good separation between rapid decelerations and flame-out conditions at low altitude, but as the pressure drops at high altitude the rate of change of shaft speed decreases, and it has been found that this system cannot differentiate between a flame-out condition at high altitude and a rapid deceleration at low altitude.

The results of using these two systems has been that the engine igniter has been brought into operation by the control system more often than has been required for flame-out conditions, with a consequent reduction in life of the igniter and more frequent grounding of the aircraft for additional servicing.

It is an object of the invention to provide an automatic ignition control system which avoids the above-mentioned defects, and it is a further object of the invention to provide an automatic ignition control system suitable for incorporation in an electrical engine control system.

According to the present invention there is provided an automatic re-light control system for a gas turbine engine comprising means for producing a signal corresponding to the quotient of the rate of change of speed of an engine main shaft and an engine pressure, means for producing a scheduled value, means for comparing said signal with the scheduled value, and means operating an engine re-light system if said signal reaches a given predetermined relationship to the scheduled value.

According to a preferred form of the present invention there is provided an automatic re-light control system for a gas turbine engine comprising means for determining the speed of an engine shaft, means for determining the rate of change of speed of the engine shaft and producing a first signal corresponding thereto, means for determining an engine pressure and producing a second signal corresponding thereto, means for producing a third signal corresponding to the quotient of said first and second signals, means for comparing said third signal with a scheduled value and means for operating an igniter if the third signal reaches given predetermined relationship to the scheduled value.

Preferably the igniter is operated when the third signal exceeds the scheduled value.

We have found that a good separation can be produced between the values of the quotient for maximum decelerations and flame-outs at any flight conditions of the engine.

The signals are preferably produced by electrical means.

Also preferably the said engine pressure is dependent on engine rotational speed.

Preferably the engine has low and high pressure compressors, the said engine pressure being the high pressure compressor delivery pressure.

There are preferably provided means for determining engine inlet temperature and means for producing the scheduled value from the engine inlet temperature and the engine shaft speed.

Preferably the scheduled value is produced from the quotient of engine shaft speed and the square root of engine inlet temperature.

The means for producing the scheduled value preferably comprises means for converting the quotient of engine shaft speed and the square root of engine inlet temperature to a quotient of rate of change of engine shaft speed and the high pressure compressor delivery pressure.

Such converting means may comprise a function generator, or in digital system a computer which stores a curve of the two quotients.

Figure 2:
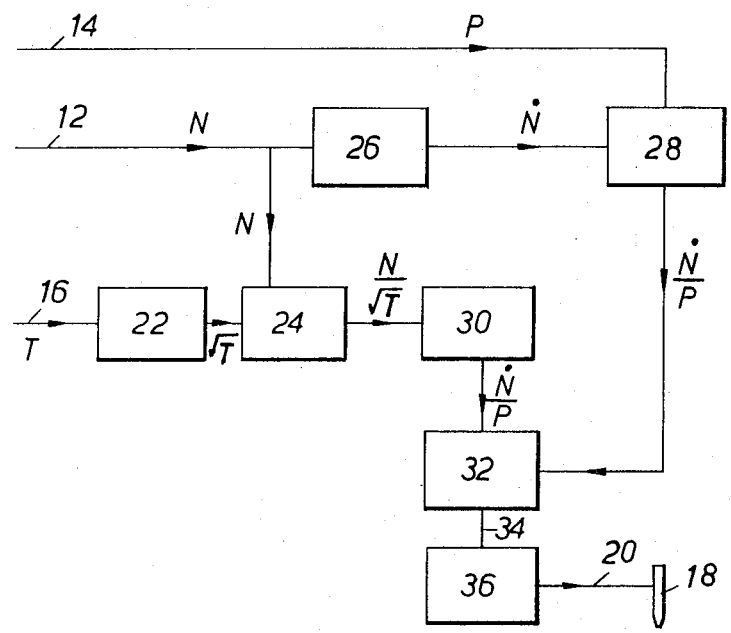
Figure 3:
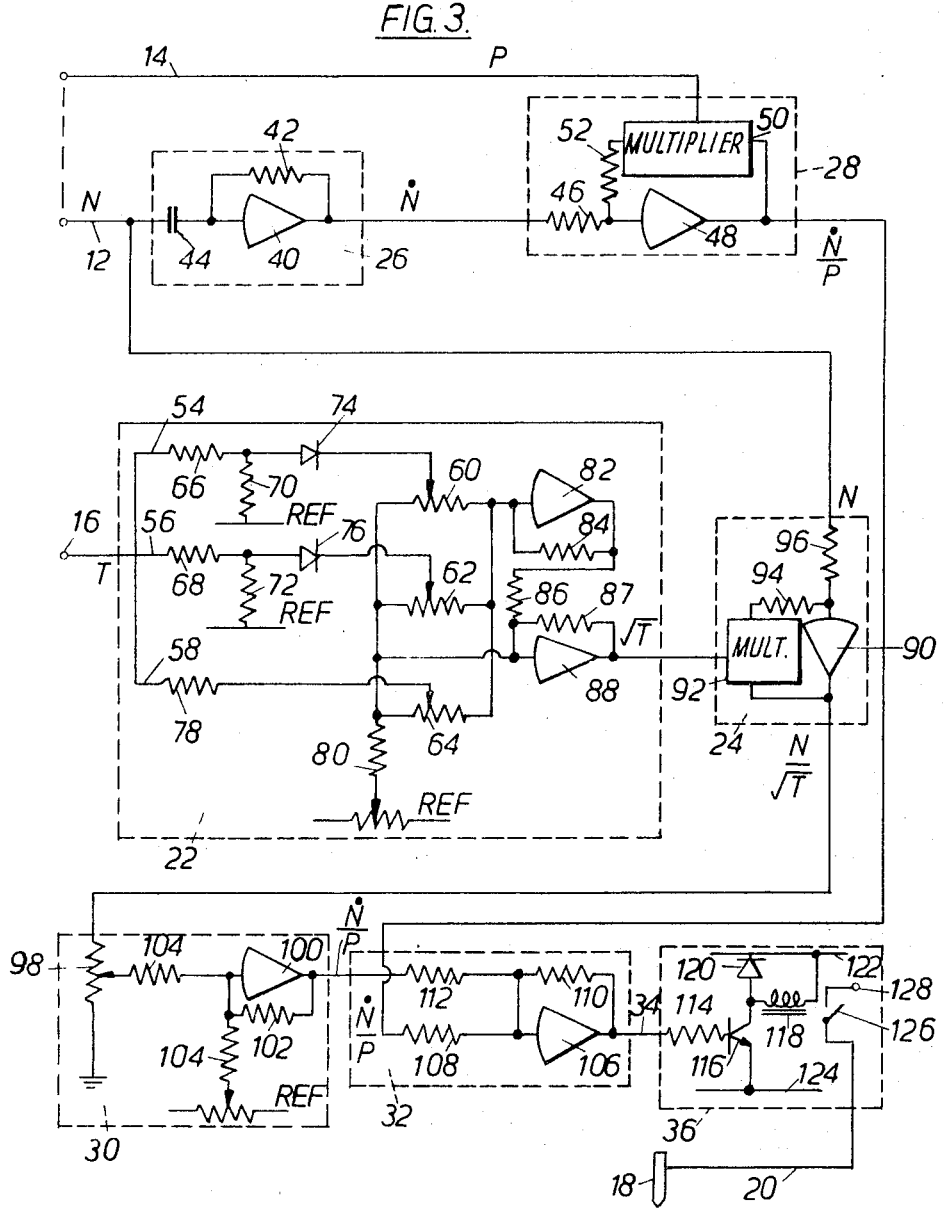

The invention will now be more particularly described merely by way of example with reference to the accompanying drawings in which:

FIG. 1 is a diagrammatic representation of a gas turbine engine incorporating the present invention, FIG. 2 is a diagrammatic lay-out of the control system circuit and FIG. 3 is a basic circuit diagram of the control system.

Referring now to the drawings in FIG. 1 there is shown a gas turbine engine having a compressor 2, combustion equipment 4, a turbine 6 and a propulsion nozzle 8 all in flow series. The engine may be a single or multishaft engine and in the present case the compressor and turbine include high pressure (H.P.) and low pressure (L.P.) sections connected by independent high pressure and low pressure shafts respectively.

A re-light control mechanism is indicated at 10 and input signal lines corresponding to shaft speed (N), high pressure compressor delivery pressure (P) and inlet temperature (T) are indicated at 12, 14 and 16 respectively, while an output signal to an igniter 18 is indicated by the line 20.

The control system is shown in FIG. 2. Both the rate of change of shaft speed (represented by $\dot{N}$) and compressor delivery pressure (P) are functions of the engine parameter $N/\sqrt{T}$ (where T is the temperature at the inlet to the engine). Thus the ratio $\dot{N}/P$ is a function of $N/\sqrt{T}$ and $N/\sqrt{T}$ may be used as a scheduling parameter as will be described below.

It is expected that the function relating $\dot{N}/P$ and $N/\sqrt{T}$ is such that $\dot{N}/P$ is nearly constant of $N/\sqrt{T}$, but where there is a variation, use of $N/\sqrt{T}$ as the scheduling parameter precludes errors in the control system which would be caused by such variation.

The control system thus requires three parameters to be measured, the speed of the H.P. shaft (N) the compressor delivery pressure (P) and the inlet temperature (T).

The value of (T) is taken by a temperature sensor, which may be of any suitable type, for example, a thermocouple, is fed into the control system via line 16, the signal passes to a unit 22 which produces a signal corresponding to the square root of (T).

The $\sqrt{T}$ signal passes to a dividing unit 24 capable of producing a quotient signal, into which is also passed an (N) signal from line 12. The (N) signal is produced by a shaft speed sensor which may be of any suitable type for example a magnetic pulse probe. The dividing unit 24 produces a signal corresponding to N/$\sqrt{T}$ which is then passed to a scheduling unit 30.

The (N) signal in line 12 passes to a differentiator unit 26 which produces a signal corresponding to the rate of change of the shaft speed i.e. ($\dot{N}$), and this then passes to a second dividing unit 28. The dividing unit also receives a pressure signal (P) from line 14, which is produced by a pressure sensor in the H.P. compressor delivery duct. The dividing unit 28 produces a signal corresponding to $\dot{N}$/P which then passes to a comparator unit 32.

The scheduling unit is a device which receives the N/$\sqrt{T}$ signal from the dividing unit 24 and produces a corresponding $\dot{N}$/P signal. Devices capable of performing this operation are known per se, and may take the form of a function generator, or in a digital system, a computer which stores a curve of N/$\sqrt{T}$ against $\dot{N}$/P. The resulting $\dot{N}$/P signal, i.e. the scheduled value is passed to the comparator 32.

In the comparator unit the measured value of the $\dot{N}$/P and the scheduled value of $\dot{N}$/P for the same N/$\sqrt{T}$, are compared, and a signal is produced to operate the igniters only when the measured value reaches a predetermined relationship to the scheduled value. This signal passes via line 34 to an ignition unit 36 and hence to the ignition system included in the combustion equipment 4. In the above example, when $\dot{N}$/P measured is greater than $\dot{N}$/P scheduled, the igniters 18 are automatically switched on.

The units required for division, differentiation and for forming square root signals are all known in electrical circuits and can easily be formed into a control circuit, and since it is relatively a simple matter to obtain the three readings of temperature, shaft speed and pressure in electrical form such a control system can form part of an electrical engine control system with only minor modifications.

Any engine pressure may be used in the $\dot{N}$/P parameter but preferably an engine rotational speed — dependent pressure is used and thus the H.P. compressor delivery pressure is a convenient pressure since it produces a constant value of $\dot{N}$/P virtually independent of N/$\sqrt{T}$. Thus the schedule can be a straight line, possibly with a slight slope.

Similarly either of the two shaft speeds could be used but since the H.P. shaft is the first to respond to any decrease in combustion pressure, a quicker-acting system can be made using H.P. shaft speed as the basis for control.

The above described system gives a sufficiently good separation between $\dot{N}$/P values at maximum deceleration, and flame-out conditions that unnecessary use of the igniters can be virtually eliminated.

FIG. 3 is a basic circuit diagram of the apparatus and, since as stated above, the units required for division, differentiation etc. are all well known, this figure is merely an example of a circuit which will carry the invention into effect. Furthermore various filters and additional circuitry may be added to improve accuracy and/or to reduce interference such as noise and chatter in the circuit.

The speed signal N is fed into the differentiator 26 which consists of a capacitor 44 and a very high gain amplifier 40 having a feedback loop which includes a resistor 42. The resulting signal $\dot{N}$ is fed to the divider 28 together with the pressure signal P. The signal $\dot{N}$ is fed through a resistor 46 and a very high gain amplifier 48 whilst the signal P is fed to a multiplier 50 which is connected in the feedback loop around the amplifier 50 together with a resistor 52.

The unit 22 converts the signal T to $\sqrt{T}$ and consists of a function generator. The function generator is calibrated to effectively store values of $\sqrt{T}$ against T, but since this is a curve, the curve is split into several straight line graphs, and in this particular example, the curve is represented by three straight lines. The three lines 54, 56, 58 represent the three straight lines on the graph of T against $\sqrt{T}$. Each of these lines is connected to a resistor 60, 62, 64 respectively which are adjusted to give the required value of $\sqrt{T}$. The lines 54 and 56 include respectively a resistor 66,68, a connection to a reference voltage via a resistor 70,72 and a diode 74,76. The line 58 includes a resistor 78. A reference voltage is fed to the resistors 60, 62, 64 via a resistor 80 and the outputs from the resistors 60,62,64 are fed to a very high gain amplifier 82 with a feedback resistor 84 and via a resistor 86 to a further very high gain amplifier 88 with a feedback resistor 87. The amplifier is also fed with a reference voltage from the resistor 80.

The divider 24 is essentially the same as the divider 28, consisting of a very high gain amplifier 90 with a feed back loop containing a multiplier 92 and a resistor 94. The signal N is fed to the amplifier 90 via a resistor 96, and the signal $\sqrt{T}$ is fed to the multiplier 92.

The unit 30 again consists of a function generator and converts N/$\sqrt{T}$ to $\dot{N}$/P by effectively storing a straight-line relationship between the two values. It consists of a resistor 98 to which the signal N/$\sqrt{T}$ is supplied, the resistor being connected to earth. A signal is taken off the resistor corresponding to $\dot{N}$/P and passed to a very high gain amplifier 100 having a feedback resistor 102 via a resistor 104. The amplifier 100 is also fed with a reference voltage via a resistor 104.

The comparator 32 consists of a very high gain amplifier 106 and the measured value of $\dot{N}$/P is fed to this via a resistor 108. The amplifier has a feedback loop including a resistor 110 and the scheduled value of $\dot{N}$/P is fed into the feedback loop via a resistor 112. If the measured value of $\dot{N}$/P is greater than the scheduled value of $\dot{N}$/P a signal is passed along line 34 to the ignition unit 36. This consists of a resistor 114 connected in series with a transistor 116. When a signal reaches the transistor 116, the transistor is made conductive and a current flows through a solenoid 118 and a diode 120 from power supply lines 122 and 124. The solenoid activates a switch 126 which connects a power supply 128 to the igniter 18 via the line 20.

I claim:

1. A re-light control system for a gas turbine engine comprising:

first means for producing a signal corresponding to the quotient of the rate of change of speed of an engine main shaft and an engine pressure, second means for producing a scheduled value, third means for comparing said signal with the scheduled value and fourth means for operating an engine re-light system if said signal reaches a given predetermined relationship to said scheduled value.

2. A re-light control system as claimed in claim 1 wherein said first means further comprises, means for determining the speed of an engine shaft, means for determining the rate of change of speed of said engine shaft and producing a first signal corresponding thereto, means for determining an engine pressure and producing a second signal corresponding thereto, and means for producing a third signal corresponding to the quotient of said first and second signals, said third means comprises means for comparing said third signal with said scheduled value, an igniter and said fourth means comprises means for operating said igniter if said third signal reaches a given predetermined relationship with said scheduled value.

3. A re-light control system as claimed in claim 2 in which said igniter is operated when said third signal exceeds said scheduled value.

4. A re-light control system as claimed in claim 2 in which said signals are produced by electrical means.

5. A re-light control system as claimed in claim 1 in which said engine pressure is dependent upon engine rotational speed.

6. A re-light control system as claimed in claim 1 in which said engine has high and low pressure compressors, said engine pressure being the high pressure compressor delivery pressure.

7. A re-light control system as claimed in claim 6 wherein said second means comprises means for determining engine inlet temperature and means for producing said scheduled value from said engine inlet temperature and said engine shaft speed.

8. A re-light control system as claimed in claim 7 in which said scheduled value is produced from the quotient of said engine shaft speed and the square root of said engine inlet temperature.

9. A re-light control system as claimed in claim 8 in which said second means for producing said scheduled value comprises means for converting said quotient of engine shaft speed and said square root of engine inlet temperature to a quotient of rate of change of engine shaft speed and the high pressure delivery pressure.

10. A re-light control system as claimed in claim 9 in which said converting means comprises a function generator.

11. A re-light control system as claimed in claim 9 in which said converting means comprises a computer which stores a curve of said two quotients.

* * * * *